(12) United States Patent
Kodama

(10) Patent No.: US 8,320,689 B2
(45) Date of Patent: Nov. 27, 2012

(54) IMAGE PROCESSING APPARATUS

(75) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1070 days.

(21) Appl. No.: 12/257,194

(22) Filed: Oct. 23, 2008

(65) Prior Publication Data

US 2009/0110310 A1 Apr. 30, 2009

(30) Foreign Application Priority Data

Oct. 24, 2007 (JP) ................................ 2007-276038

(51) Int. Cl.
*G06K 9/36* (2006.01)

(52) U.S. Cl. ....................................... 382/233

(58) Field of Classification Search ......................... None
See application file for complete search history.

(56) References Cited

U.S. PATENT DOCUMENTS

| | | | |
|---|---|---|---|
| 7,127,117 B2 | 10/2006 | Sano et al. |
| 7,158,679 B2 | 1/2007 | Sano et al. |
| 7,245,775 B2 | 7/2007 | Kodama et al. |
| 7,293,172 B2 | 11/2007 | Nishimura et al. |
| 7,310,447 B2 | 12/2007 | Yano et al. |
| 7,315,651 B2 | 1/2008 | Sakuyama et al. |
| 7,319,792 B2 | 1/2008 | Hara et al. |
| 7,333,664 B2 | 2/2008 | Sakuyama |
| 7,336,852 B2 | 2/2008 | Nomizu et al. |
| 7,352,907 B2 | 4/2008 | Sakuyama et al. |
| 7,352,908 B2 | 4/2008 | Kodama |
| 7,359,549 B2 | 4/2008 | Ikebe et al. |
| 7,362,904 B2 | 4/2008 | Hara et al. |
| 7,406,202 B2 | 7/2008 | Kodama et al. |
| 7,409,060 B2 | 8/2008 | Nomizu et al. |
| 7,409,093 B2 | 8/2008 | Ju |
| 2004/0095479 A1 | 5/2004 | Moon et al. |
| 2004/0100654 A1 | 5/2004 | Kodama et al. |
| 2004/0130570 A1 | 7/2004 | Sakuyama et al. |
| 2004/0131264 A1 | 7/2004 | Sakuyama et al. |

(Continued)

FOREIGN PATENT DOCUMENTS

JP A 2002-278778 9/2002

(Continued)

OTHER PUBLICATIONS

Japanese Office Action dated Jul. 1, 201 for Japanese Application No. 2007-276038, 2 pages.

*Primary Examiner* — Bhavesh Mehta
*Assistant Examiner* — Nirav G Patel
(74) *Attorney, Agent, or Firm* — Blakely, Sokoloff, Taylor & Zafman LLP

(57) ABSTRACT

An image processing apparatus and method execute instructions contained in multiple threads in parallel. The image processing apparatus decodes code data that is obtained by dividing image data into areas and carrying out a compression process such that the individual areas can be independently decoded. The image processing apparatus includes a first thread generating unit that allocates one execution thread to each independently compressed code, a second thread generating unit that allocates plural execution threads to each independently compressed code, and a control unit that controls the operation of the first thread generating unit and the second thread generating unit. At least part of an execution instruction for decoding the code data into image data is generated by the first thread generating unit or the second thread generating unit.

3 Claims, 10 Drawing Sheets

U.S. PATENT DOCUMENTS

| | | |
|---|---|---|
| 2004/0134978 A1 | 7/2004 | Hara et al. |
| 2004/0141651 A1 | 7/2004 | Hara et al. |
| 2004/0151386 A1 | 8/2004 | Kodama et al. |
| 2004/0151387 A1 | 8/2004 | Sakuyama et al. |
| 2004/0156548 A1 | 8/2004 | Kodama et al. |
| 2004/0165780 A1 | 8/2004 | Maki et al. |
| 2004/0190782 A1 | 9/2004 | Nomizu et al. |
| 2004/0201593 A1 | 10/2004 | Nishimura et al. |
| 2004/0202371 A1 | 10/2004 | Kodama et al. |
| 2004/0208379 A1 | 10/2004 | Kodama et al. |
| 2004/0208380 A1 | 10/2004 | Aoki et al. |
| 2004/0212843 A1 | 10/2004 | Kodama et al. |
| 2004/0213472 A1 | 10/2004 | Kodama et al. |
| 2004/0217887 A1 | 11/2004 | Nomizu et al. |
| 2004/0218817 A1 | 11/2004 | Kodama et al. |
| 2004/0252897 A1 | 12/2004 | Hara et al. |
| 2005/0036701 A1 | 2/2005 | Miyazawa et al. |
| 2005/0053239 A1 | 3/2005 | Nomizu et al. |
| 2005/0074172 A1 | 4/2005 | Kodama |
| 2005/0207659 A1 | 9/2005 | Kodama |
| 2007/0076962 A1 | 4/2007 | Kodama |
| 2007/0110163 A1 | 5/2007 | Kodama |
| 2007/0121720 A1* | 5/2007 | Yamane et al. .......... 375/240.08 |

FOREIGN PATENT DOCUMENTS

| | | |
|---|---|---|
| JP | 2004242273 | 8/2004 |
| JP | A 2005-259042 | 9/2005 |
| JP | B 3797013 | 4/2006 |
| JP | 2007014002 | 1/2007 |

* cited by examiner

FIG.7

| Thread0 | Inst0 | Inst1 | Inst2 | Inst3 | Inst4 | Inst5 | Inst9 |
|---------|-------|-------|-------|-------|-------|-------|-------|
| Thread1 |       |       |       |       |       | Inst6 |       |
| Thread2 |       |       |       |       |       | Inst7 |       |
| Thread3 |       |       |       |       |       | Inst8 |       |

FIG.8

| Thread0 | Inst0 | Inst2 | Inst5 |
|---------|-------|-------|-------|
| Thread1 | Inst1 | Inst6 | Inst9 |
| Thread2 | Inst3 | Inst7 |       |
| Thread3 | Inst4 | Inst8 |       |

IMAGE PROCESSING APPARATUS

PRIORITY

The present application claims priority to Japanese Priority Application No. 2007-276038 filed Oct. 24, 2007, the entire contents of which are hereby incorporated by reference.

BACKGROUND OF THE INVENTION

1. Field of the Invention

The present invention generally relates to image processing apparatuses and image processing methods. More particularly, the present invention relates to image data compression/expansion methods.

2. Description of the Related Art

The progress made in computer technology in the recent years has resulted in the development of various hardware resources, such as high-speed processors and large-capacity memories. One particular example is a technology that allows a single processor to logically function as plural processors. Such a processor is capable of executing instructions contained in multiple threads in a parallel manner. The technology is expected to bring about increases in image processing speeds, and several specific image processing methods based on the technology have been proposed.

One example is discussed in Japanese Laid-Open Patent Application No. 2005-259042, which proposes an image processing method and image processing program whereby plural threads for executing image processing are divided into groups according to the processing method used for each of the threads. Another example is discussed in Japanese Patent No. 3,797,013, which proposes an image processing method, a printing device, an image processing system, and a recording medium, whereby the number of processors allocated for halftoning is varied, and the processors allocated are varied depending on resolution.

These image processing methods, however, are not capable of making appropriate divisions to achieve an increase in speed in the case of JPEG 2000, for example, where codes that can be executed in parallel and codes that cannot be executed in parallel coexist, depending on the code that is processed. In other words, it has been difficult to achieve increases in speed in a decoding process for a code according to a JPEG 2000 image processing method, for example, where the code can be decoded independently on an area by area basis, because of the presence of both a portion that allows for parallel processing and another portion that does not allow for parallel processing, thus requiring complicated processing.

SUMMARY OF THE INVENTION

An image processing apparatus is described. In one embodiment, the image processing apparatus comprises a first thread generating unit to allocate a single execution thread to an independently compressed code in a decoding process; a second thread generating unit to allocate plural execution threads to an independently compressed code in the decoding process; and a control unit to control an operation of each of the first thread generating unit and the second thread generating unit, wherein at least a part of an execution instruction to decode the code data into image data is generated using the first thread generating unit or the second thread generating unit.

BRIEF DESCRIPTION OF THE DRAWINGS

These and other embodiments, features and advantages of the invention will be apparent to those skilled in the art from the following detailed description of the invention, when read in conjunction with the accompanying drawings in which:

FIG. 7 shows another example of a multi-thread process;

FIG. 8 shows yet another example of a multi-thread process;

DETAILED DESCRIPTION OF THE PREFERRED EMBODIMENTS

Embodiments of a novel and useful image processing apparatus and image processing method in which one or more of the aforementioned problems of the related art are eliminated have been described. A more specific embodiment comprises an image processing apparatus and image processing method whereby instructions contained in plural threads can be executed in parallel, thereby enabling a high-speed image processing.

In one embodiment, one embodiment of the invention includes an image processing apparatus for decoding image code data that is obtained by dividing image data into areas and compressing the image data so that each of the areas can be independently decoded. The apparatus comprises a first thread generating unit to allocate an execution thread to an independently compressed code in a decoding process; a second thread generating unit to allocate plural execution threads to an independently compressed code in the decoding process; and a control unit to control an operation of each of the first thread generating unit and the second thread generating unit. At least a part of an execution instruction to decode the code data into image data is generated using the first thread generating unit or the second thread generating unit.

Figure 1:
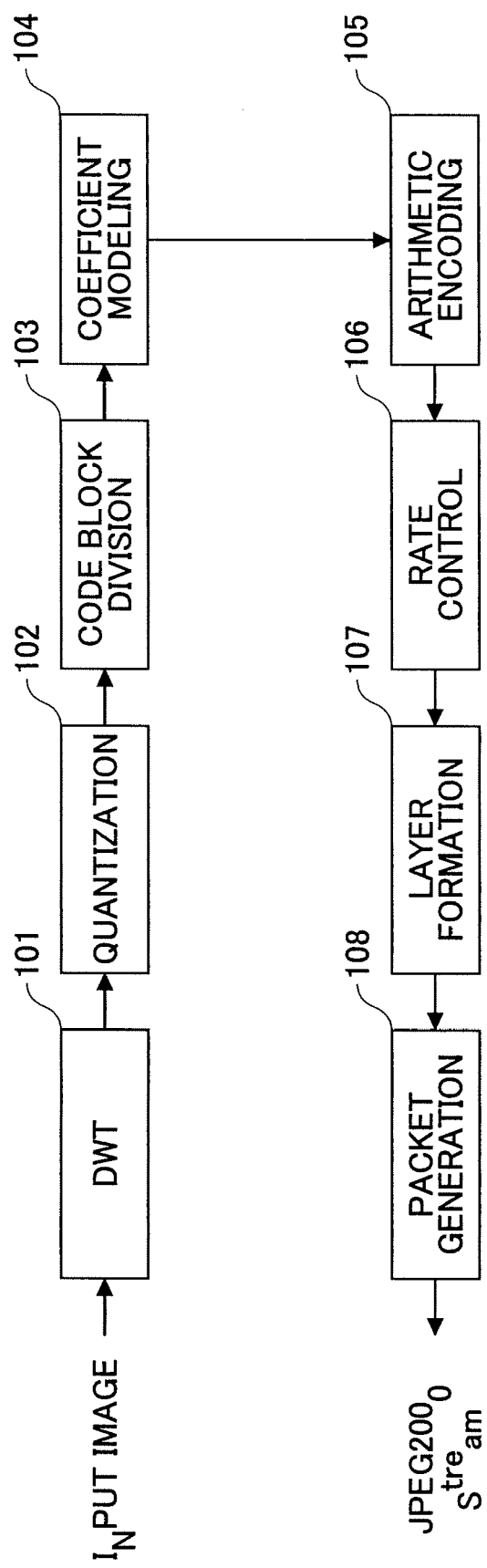
FIG. 1 shows a block diagram of a JPEG 2000 encoder.

FIG. 1 shows a block diagram of a JPEG 2000 encoder. An input image is initially subjected to subband decomposition by discreet wavelet transform ("DWT") 101, followed by quantization by a quantizing unit 102.

Figure 2:
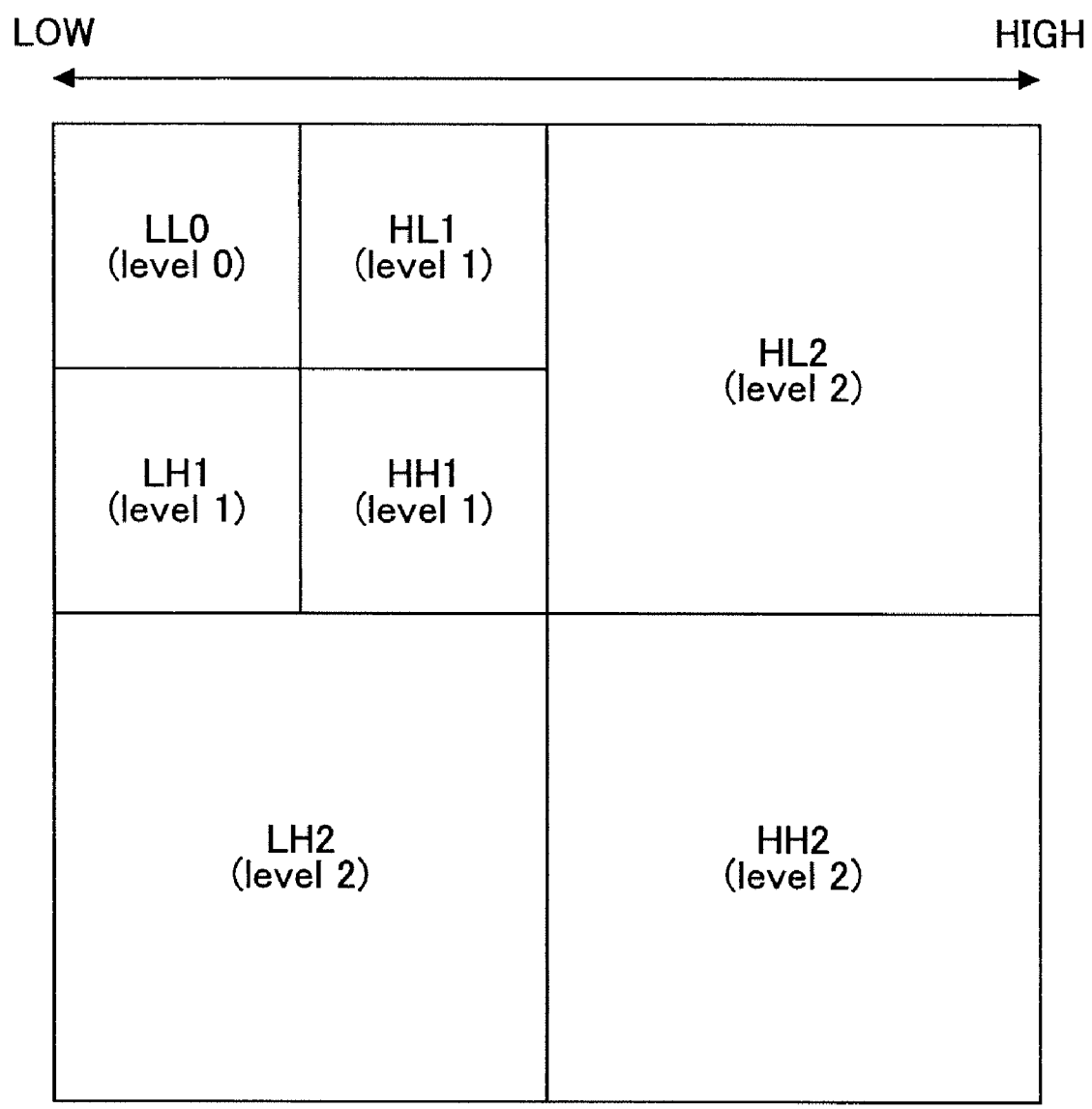
FIG. 2 shows an example of subband decomposition by DWT according to JPEG 2000.

FIG. 2 shows an example of subband decomposition when the decomposition level is 2 (resolution level number 3), where there are resolution levels from level 0 to level 2. Coefficients that belong to smaller resolution levels have information of smaller frequencies.

Quantized wavelet coefficients are encoded by an Embedded Block Coding with Optimal Truncation (EBCOT) algorithm. In a code block division unit 103, each subband is divided into square blocks (such as 64×64) referred to as "code blocks". These code blocks are individually and independently encoded.

Thereafter, in a coefficient modeling unit 104, a coefficient modeling based on a bit plane is performed on a wavelet coefficient string of each code block. As a result, an embedded code stream is generated in which coefficient bits are arranged in order of importance. Each of the bit planes from the MSB to the LSB are decomposed into three sub-bit planes (passes) depending on context.

The boundaries of the individual sub-bit planes are called "truncation points", which are the minimum units of division based on which data is discarded later. In an arithmetic coding unit 105 and a rate control unit 106, the embedded code stream generated by coefficient modeling is subjected to adaptive arithmetic coding. The arithmetic code stream is appropriately truncated in units corresponding to the truncation points defining the boundary between the sub-bit planes, thereby obtaining a target bit rate.

In a layer forming unit 107, when it is necessary to make displays successively with plural image quality levels, i.e., when an SNR scalability is required, a code layer formation is performed. Each layer includes a part of an embedded code of each code block. Higher layers include more important components for the reproduction of an image. Each layer is then decomposed by a packet generating unit 108 into plural units referred to as "bodies", to each of which header information is attached to generate a packet. Each of the bodies has information of a corresponding resolution level. Thus, the total number of the packets generated is the product of the number of layers and the number of resolution levels. The header information may include the length of the arithmetic code stream of each code block, and the number of the sub-bit planes.

Figure 3:
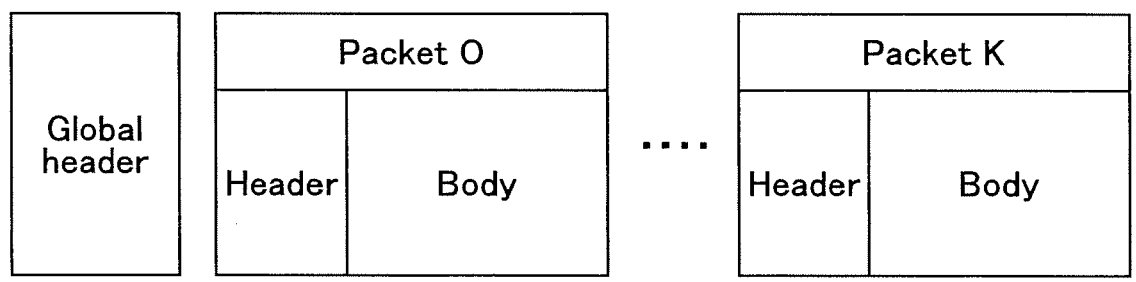
FIG. 3 shows a code stream according to JPEG 2000.

As shown in FIG. 3, all of the packets are combined and global header information is attached, thereby providing a final JPEG 2000 code stream. JPEG 2000 specifies that the size of the aforementioned various header information or the sub-bit plane as the minimum unit of data division be an integer multiple of one byte.

Figure 4:
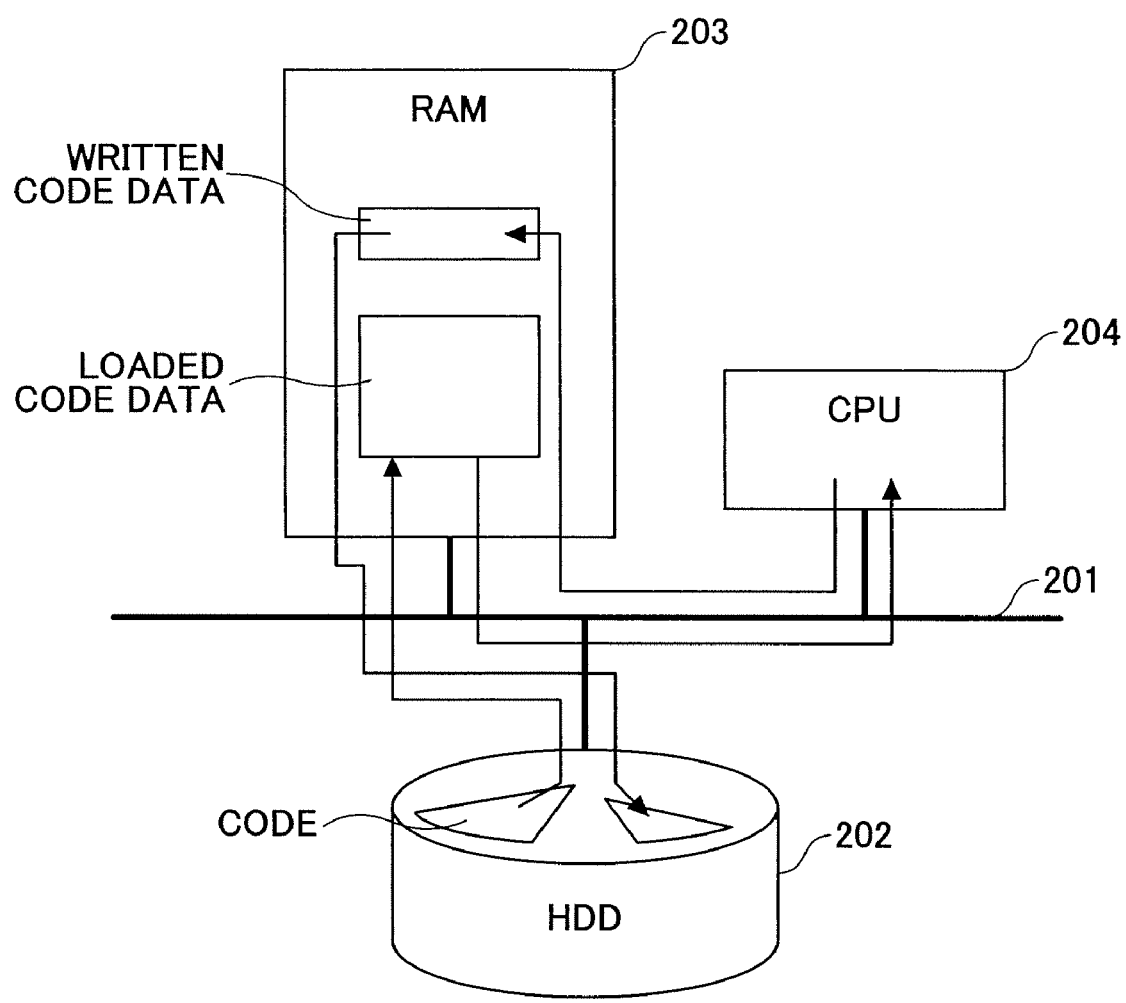
FIG. 4 shows a block diagram of an image processing apparatus according to an embodiment of the present invention.

FIG. 4 shows a block diagram of an image processing apparatus (which may be a personal computer ("PC")) according to an embodiment of the present invention. Via a data bus 201, a hard disk drive (HDD) 202, a random access memory (RAM; within the PC) 203, and a central processing unit (CPU; within the PC) 204 are connected.

Code data is decoded in the following flow. Code data recorded on the HDD 202 is read onto the RAM 203 by an instruction from the CPU 204. The CPU 204 reads the code on the RAM 203, and performs a decoding process. The CPU 204 writes the decoded data in another area on the RAM 203. Upon instruction from the CPU 204, the decoded data is recorded on the HDD 202. The CPU 204 is capable of executing plural threads in parallel.

FIGS. 5 through 8 show relationships between execution instructions and threads in the CPU. Instructions that are executed are designated by Instruction 0 through Instruction 9. Threads that can be executed by the CPU in parallel are designated by Thread 0 through Thread 4.

Figure 5:
FIG. 5 shows an example of a single-thread process.
Figure 6:
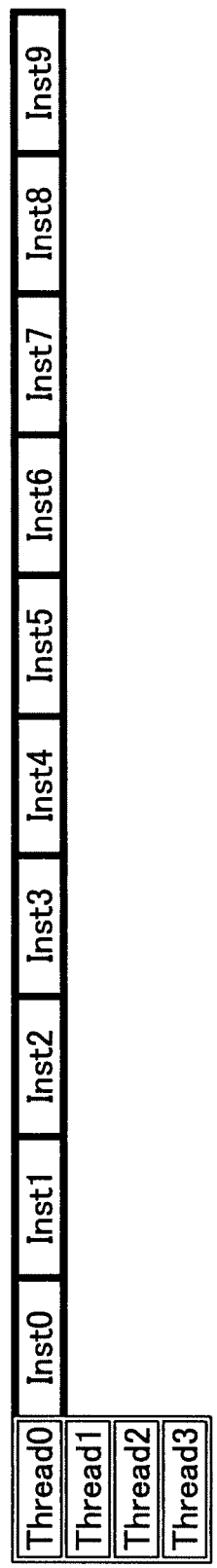
FIG. 6 shows an example of a multi-thread process.

FIG. 5 shows an example in which the CPU can execute only one thread at a time. Such a CPU is referred to as a single-thread CPU. FIGS. 6 through 8 show examples in which the CPU can execute four threads in parallel. Such a CPU is referred to as a multithread CPU.

FIG. 6 shows a case where the CPU is capable of executing four threads in parallel; however, the CPU is unable to execute the threads in parallel for various reasons, such as that Instruction 1 utilizes the result of Instruction 0, for example. Consequently, the decoding process is the same as in the case of a single-thread CPU.

FIG. 7 shows a case where the threads can be executed partially in parallel (Threads 5 through 8). In this case, partial multi-thread processing can be carried out, so that a 30% reduction in process time is achieved.

FIG. 8 shows an example in which all of the threads can be executed in parallel. As shown, the entire processing is completed within the intervals of three instructions, achieving a 70% reduction in process time.

Figure 9:
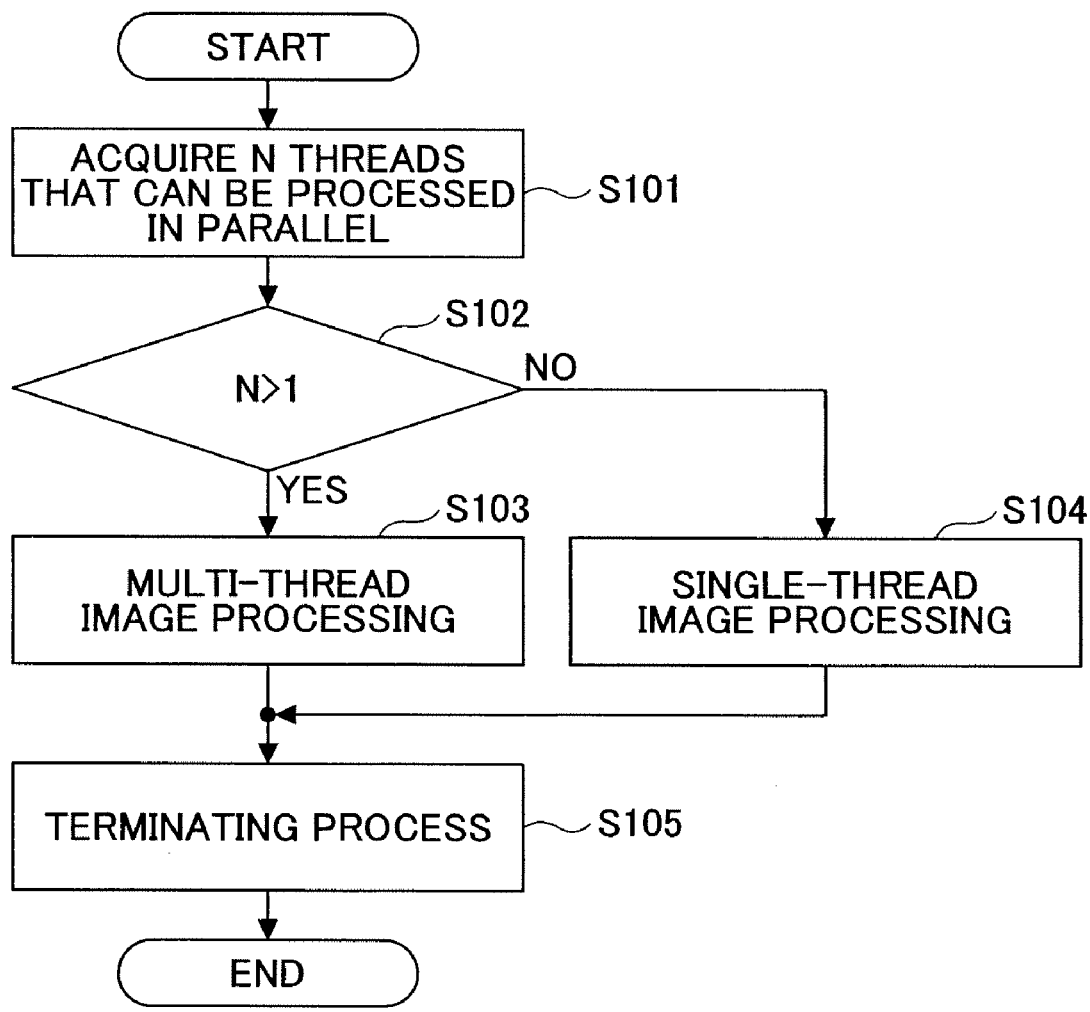
FIG. 9 shows a flowchart of an image processing operation according to a first embodiment of the present invention.

FIG. 9 shows a flowchart of an image processing operation according to a first embodiment of the present invention. In the present embodiment, code data that compresses an image is decoded to generate image data.

First, a number N of threads that can be executed in parallel by the PC that performs the decoding process is acquired (step S101). It is then determined whether the acquired number of threads N>1 (step S102). If N>1 ("YES" in step S102), multi-thread processing is executed (step S103). If $N \leq 1$ ("NO" in step S102), single-thread processing is executed (step S104), followed by a terminating process (step S105).

The terminating process, which may include a program terminating process and the output of generated image data, may not be necessarily implemented. The single-thread process involves an operation similar to that of a general application program, whereby instruction strings are generated one by one and executed by the CPU.

Figure 10:
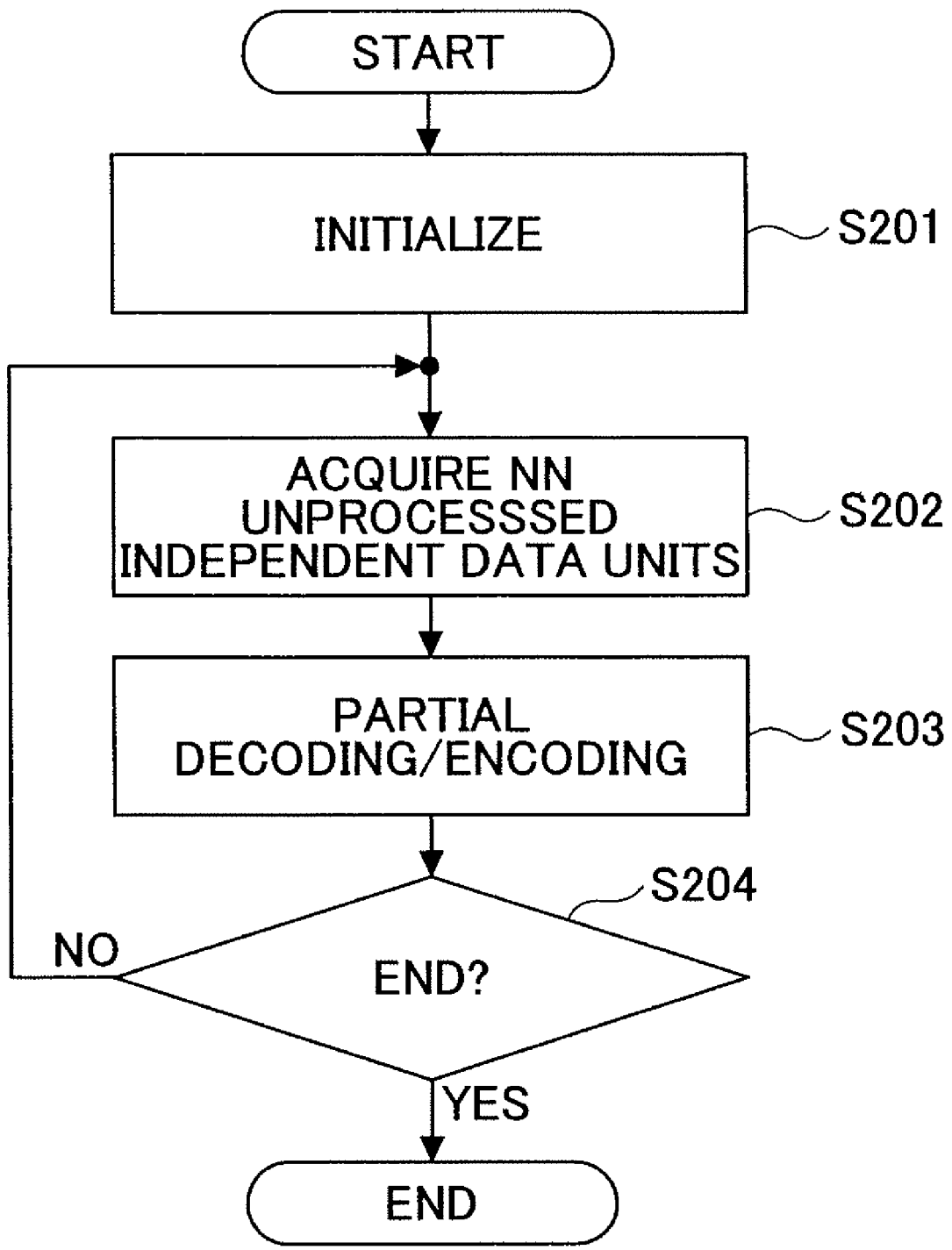
FIG. 10 shows a flowchart of a decoding/encoding operation based on multi-thread processing.

In the following, a description is given of a decoding operation in multi-thread processing with reference to a flowchart shown in FIG. 10.

First, initialization for multi-thread processing is conducted (step S201). In an initial setting, N1=0 where N1 is the number of threads that are being executed. Of the code data that is subjected to the decoding process, the number NTILE of data units that can be independently decoded (such as the tiles of JPEG 2000) is calculated. The number ND of independent process units that have already been processed is zero. From NTILE and ND, the number NN of independent data that are yet to be processed is calculated (step S202):

$$NN = NTILE - ND$$

Thread division is performed as follows. From the number N1 of threads being executed and the number N of available threads, the number NT of threads that are not being used is calculated:

$$NT = N - N1$$

If the number NN of the unprocessed independent data is greater than NT, each of the independent data units is executed with an individual thread. If the number NN of unprocessed independent data is the same as NT, all of the independent data are also executed with a single thread. If the number NN of unprocessed independent data is smaller than NT, a number NN-1 of independent data is executed with a single thread, and the last one independent data is executed with plural threads. The number N1 of threads being executed and the number NN of unprocessed independent data are then updated (step S203).

$$N1 = N1 + NT$$

$$NN = NN - NT$$

When all of the tiles have been processed (N0=1 and NN=0), the process ends (step S204).

The present embodiment is merely an example and the above thread dividing method is also merely an example. In accordance with the present embodiment, when an instruction string executed by the CPU is generated, there are provided a method whereby independent data units are divided into individually different threads, and a method whereby an independent unit of data is divided into plural threads, in addition to a conventional method of generating instructions.

Using such thread generating methods, an instruction string that is executed is generated efficiently, depending on conditions such as the type and number of CPUs, the number of cores, the size of the PC's memory, the size of the area of a compressed code, etc., whereby a high-speed operation is realized.

While in the foregoing embodiment, the alternatives are the first thread generating method and the second thread generating method, the conventional thread generating unit may be used when it is determined that, in consideration of process speed, neither the first thread generating method nor the second thread generating method should be used.

In the following, a description is given of an encoding process in an image processing operation according to the present embodiment, in which an image is compressed to generate code data. With reference to FIG. 9, a number N of threads that can be executed in parallel by the PC that performs the encoding process is obtained (step S101). It is then determined if the acquired thread number N>1 (step S102). If N>1 ("YES" in step S102), multi-thread processing is performed (step S103). On the other hand, if N≦1 ("NO" in step S102), a single-thread process is performed (step S104). These steps are followed by a terminating process (step S105). The terminating process, which may include a program terminating process and the output of generated code data, may not be necessarily carried out. The single-thread process involves an operation similar to that of a general application program, whereby instruction strings are generated one by one and executed by the CPU.

In the following, a description is given of an encoding operation in multi-thread processing with reference to FIG. 10.

First, initialization for multi-thread processing is conducted (step S201). In an initial setting, N1=0 where N1 is the number of threads that are being executed. Of the code data that is subjected to the encoding process, the number NTILE of data units that can be independently decoded (such as the tiles of JPEG 2000) is calculated. The number ND of independent process units that have already been processed is zero. From NTILE and ND, the number NN of independent data that are yet to be processed is calculated (step S202):

$$NN=NTILE-ND$$

Thread division is performed as follows. From the number N1 of threads being executed and the number N of available threads, the number NT of threads that are not being used is calculated:

$$NT=N-N1$$

If the number NN of the unprocessed independent data is greater than NT, each of the independent data units is executed with a single thread. If the number NN of unprocessed independent data is the same as NT, all of the independent data are also executed with a single thread. If the number NN of unprocessed independent data is smaller than NT, a number NN-1 of independent data is executed with a single thread, and the last one independent data is executed with plural threads. The number N1 of threads being executed and the number NN of unprocessed independent data are then updated (step S203).

$$N1=N1+NT$$

$$NN=NN-NT$$

When all of the tiles have been processed (N1=0 and NN=0), the process ends (step S204).

The present embodiment is merely an example and the above thread dividing method is also merely an example. In accordance with the present embodiment, when an instruction string executed by the CPU is generated, there are provided a method whereby independent data units are divided into individually different threads, and a method whereby an independent unit of data is divided into plural threads, in addition to a conventional method of generating instructions.

Using such thread generating methods, an instruction string that is executed is generated efficiently, depending on conditions such as the type and number of CPUs, the number of cores, the size of the PC's memory, the size of the area of a compressed code, etc., whereby a high-speed operation is realized.

While in the foregoing embodiment, the alternatives are the first thread generating method and the second thread generating method, the conventional thread generating method may be used when it is determined that, in consideration of process speed, neither the first thread generating method nor the second thread generating method should be used.

Figure 11:
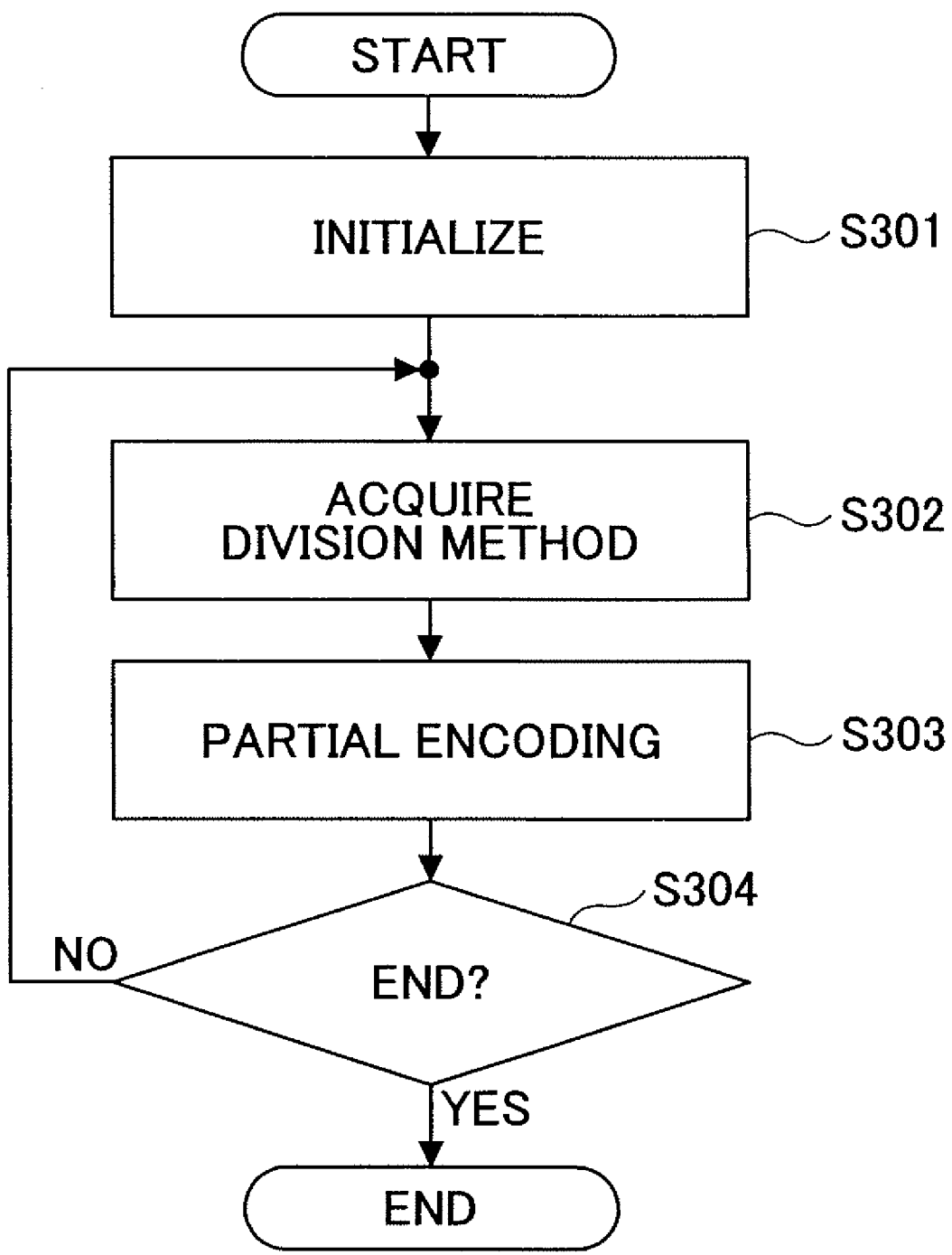
FIG. 11 shows a flowchart of an image processing operation according to a second embodiment of the present invention.

FIG. 11 shows a flowchart illustrating the flow of multi-thread processing in an image processing operation in a second embodiment of the invention.

First, initialization for multi-thread processing is conducted (step S301). In an initial setting, N1=0 where N1 indicates the number of threads that are being executed. The number NT of data units (such as the tiles of JPEG 2000) of the code data that is subjected to the decoding process that can be independently decoded is calculated. The number ND of independent process units that have already been processed is zero.

As a control method, a division control method recorded in a division control method storage unit is acquired (step S302). The division control method stored in the storage unit may be determined by a setting through the U/I, a setting from past results, a default value setting, a control method depending on the type of CPU, a control method depending on the number of CPUs, a control method depending on the number of CPU cores, a control method for each tile size, and a control method for each precinct size.

Thereafter, thread division is performed in accordance with the division control method that has been acquired (step S303). After all of the tiles are processed, the process ends (step S304).

When one thread is allocated to unprocessed independent data D, a single thread is used for execution. When plural threads are allocated to the unprocessed independent data D, plural threads are used for execution. For example, actual numbers such as "2" or "4" may be set.

Figure 12:
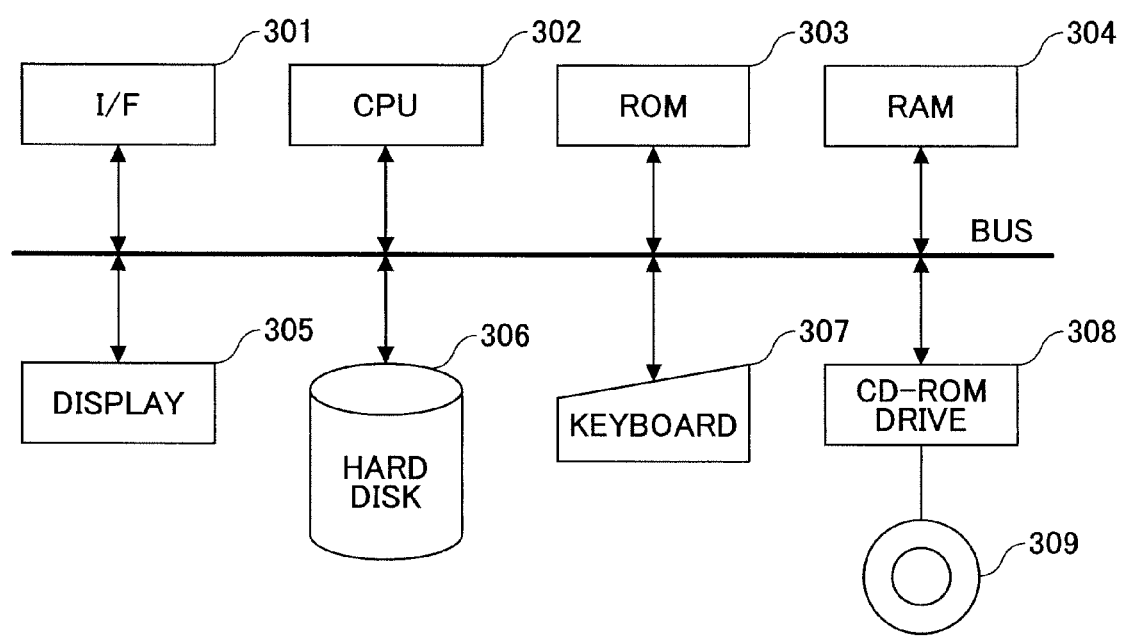
FIG. 12 shows a block diagram of an apparatus for starting up a program for implementing an image processing method according to an embodiment of the present invention.

FIG. 12 shows a block diagram of an apparatus for starting up a program for carrying out the image processing method according to any one of the various embodiments of the present invention. The apparatus is an image processing system (i.e., hardware) that may include a microprocessor for executing the image processing methods (i.e., software) according to the foregoing embodiments.

The image processing system includes an I/F 301, a CPU 302, a ROM 303, a RAM 304, a display device 305, a hard disk drive (HDD) 306, a keyboard 307, and a compact-disc read-only memory (CD-ROM) drive 308. In a computer-readable recording medium 309, such as a CD-ROM, a program for executing the image processing method according to an embodiment of the present invention is stored. A control signal may be inputted via the I/F 301 from an external device.

The program may be started up in response to an instruction from an operator through the keyboard 307, or automatically. The CPU 302 performs image processing according to the image processing method, based on the program. A result of such processing may be stored in the RAM 304 or the HDD 306 and/or outputted to the display device 305 as needed.

Thus, by using the recording medium storing the program for executing the image processing method according to any of the embodiments, an image processing system can be constructed without requiring changes in an existing system.

Although this invention has been described in detail with reference to certain embodiments, variations and modifications exist within the scope and spirit of the invention as described and defined in the following claims.

What is claimed is:

1. An image processing apparatus for decoding image code data that is obtained by dividing image data into areas and compressing the image data so that each of the areas can be independently decoded, the apparatus comprising:
   a first thread generating unit to allocate a single execution thread to an independently compressed code in a decoding process;
   a second thread generating unit to allocate plural execution threads to an independently compressed code in the decoding process; and
   a control unit to control an operation of each of the first thread generating unit and the second thread generating unit,
   wherein at least a part of an execution instruction to decode the code data into image data is generated using the first thread generating unit or the second thread generating unit, wherein the control unit changes the control of the first thread generating unit and the second thread generating unit during a single decoding process, and wherein the control unit controls the first thread generating unit and the second thread generating unit in such a manner that the first thread generating unit is used when the number of independently compressed codes is larger than a constant number, and the second thread generating unit is used when the number of independently compressed codes is smaller than the constant number.

2. The image processing apparatus defined in claim 1 wherein the control unit controls a use of the first thread generating unit and the second thread generating unit based on a result of measuring a throughput of an instruction string executed by a CPU.

3. An image processing apparatus for generating a compressed code by dividing image data into areas so that each of the areas can be independently decoded, the apparatus comprising:
   a first thread generating unit to allocate a single execution thread to a code that is independently encoded in an encoding process;
   a second thread generating unit to allocate plural execution threads to a code that is independently compressed in the encoding process; and
   a control unit to control an operation of each of the first thread generating unit and the second thread generating unit,
   wherein at least a part of an execution instruction for decoding the code data into image data is generated using the first thread generating unit or the second thread generating unit, wherein the control unit changes the control of the first thread generating unit and the second thread generating unit during a single decoding process, and wherein the control unit controls the first thread generating unit and the second thread generating unit in such a manner that the first thread generating unit is used when the number of independently compressed codes is larger than a constant number, and the second thread generating unit is used when the number of independently compressed codes is smaller than the constant number.

* * * * *